(12) United States Patent
Ackerman et al.

(10) Patent No.: US 10,651,943 B2
(45) Date of Patent: May 12, 2020

(54) INHERENTLY BROADBAND LINEARIZED ELECTRO-OPTIC MODULATOR WITH CUSTOMIZABLE PERFORMANCE

(71) Applicant: Photonic Systems, Inc., Billerica, MA (US)

(72) Inventors: Edward I. Ackerman, Cambridge, MA (US); Gary E. Betts, Escondido, CA (US); Charles H. Cox, Carlisle, MA (US)

(73) Assignee: Photonic Systems, Inc., Billerica, MA (US)

( * ) Notice: Subject to any disclaimer, the term of this patent is extended or adjusted under 35 U.S.C. 154(b) by 0 days.

(21) Appl. No.: 15/655,277

(22) Filed: Jul. 20, 2017

(65) Prior Publication Data
US 2018/0026723 A1 Jan. 25, 2018

Related U.S. Application Data

(60) Provisional application No. 62/365,963, filed on Jul. 22, 2016.

(51) Int. Cl.
*H04B 10/50* (2013.01)
*G02F 1/01* (2006.01)
(Continued)

(52) U.S. Cl.
CPC ..... *H04B 10/50575* (2013.01); *G02F 1/0123* (2013.01); *G02F 1/225* (2013.01);
(Continued)

(58) Field of Classification Search
CPC ............ H04B 10/506; H04B 10/50575; H04B 10/505; H04B 10/58; H04B 10/564; H04B 10/588; G02F 1/0123; G02F 1/225
See application file for complete search history.

(56) References Cited

U.S. PATENT DOCUMENTS 6,246,500 B1  6/2001 Ackerman
2004/0208429 A1* 10/2004 Gill .................... G02F 1/225
 385/24

(Continued)

FOREIGN PATENT DOCUMENTS

EP  0 479 743 A1  4/1992
WO  98/17967 A1  4/1998

OTHER PUBLICATIONS

"Notification of Transmittal of the International Search Report and the Written Opinion of the International Searching Authoirty, or the Decalation" for International Patent Application No. PCT/US2017/043054, dated Nov. 2, 2017, 12 pages, ISA/KR, Korean Intellectual Property Office, Daejeon, Republic of Korea.

(Continued)

*Primary Examiner* — Ted M Wang
(74) *Attorney, Agent, or Firm* — Kurt Rauschenbach; Rauschenbach Patent Law Group, PLLC

(57) ABSTRACT

A linearized electro-optic modulator includes a substrate comprising a first Mach Zehnder interferometer comprising a first and second optical waveguide and a second Mach Zehnder interferometer comprising a first and a second optical waveguide. A signal electrode is positioned on the substrate to receive a modulation signal. First and second ground electrodes are positioned on the substrate and are electrically connected to ground potential. The signal electrode and the first and second ground electrodes are positioned so that an electric field generated by the signal electrode modulates both the first and second Mach Zehnder interferometers to generate a first and a second linearized modulated optical signal.

46 Claims, 10 Drawing Sheets

(51) Int. Cl.
*H04B 10/54* (2013.01)
*G02F 1/225* (2006.01)
*H04B 10/564* (2013.01)
*H04B 10/588* (2013.01)

(52) U.S. Cl.
CPC .......... *H04B 10/506* (2013.01); *H04B 10/54* (2013.01); *H04B 10/564* (2013.01); *H04B 10/588* (2013.01)

(56) References Cited

U.S. PATENT DOCUMENTS

| | | | | |
|---|---|---|---|---|
| 2004/0240765 | A1* | 12/2004 | Wooten | G02F 1/225 385/2 |
| 2007/0058988 | A1* | 3/2007 | Yonenaga | H04B 10/5051 398/186 |
| 2011/0158576 | A1 | 6/2011 | Kissa et al. | |
| 2013/0216175 | A1 | 8/2013 | Onishi | |
| 2013/0301094 | A1 | 11/2013 | Gilbert et al. | |
| 2014/0334764 | A1* | 11/2014 | Galland | G02F 1/225 385/3 |
| 2015/0293427 | A1 | 10/2015 | Goi et al. | |
| 2016/0156416 | A1 | 6/2016 | Shirakawa | |

OTHER PUBLICATIONS

Cox, Charles H. III, Analog Optical links, Theory and Practice, 2004, pp. 240-249 section 6.4.2, Cambridge University Press, Cambridge, UK.

Johnson, L.M. et al., Reduction of Intermodulation Distortion in Interferometric Optical Modulators, Oct. 1988, pp. 928-930, vol. 13, No. 9, Optics Letters.

Haus, H.A., et al., "IRE Standards on Methods of Measuring Noise in Linear Twoports,1959", Jan. 1959, pp. 60-68, vol. 48, Proceeding of the IRE.

"Notification Concerning Transmittal of International Preliminary Report on Patentability (Chapter I of the Patent Cooperation Treaty)" for International Patent Application No. PCT/US2017/043054, dated Jan. 31, 2019, 9 pages, The International Bureau of WIPO, Geneva, Switzerland.

"European Search Report" for European Patent Application No. 17831865.5, dated Jan. 29, 2020, 8 pages, European Patent Office, Munich Germany.

\* cited by examiner

US 10,651,943 B2

INHERENTLY BROADBAND LINEARIZED ELECTRO-OPTIC MODULATOR WITH CUSTOMIZABLE PERFORMANCE

CROSS REFERENCE TO RELATED APPLICATION

The present application is a non-provisional application of U.S. Provisional Patent Application Ser. No. 62/365,963, entitled "Inherently Broadband Linearized Electro-Optic Modulator with Customizable Performance" filed on Jul. 22, 2016. The entire content of U.S. Provisional Patent Application Ser. No. 62/365,963 is herein incorporated by reference.

INTRODUCTION

Modulation of an optical carrier by an electrical signal is often accomplished using an electro-optic modulator. In some applications, the linearity with which the electrical modulation is imposed on the optical carrier is important. Strictly linear modulation can be accomplished using a phase modulator. However, there is no known optical detector that can detect optical phase modulation. One way to detect phase modulation using a conventional photodetector is to convert the phase modulation into intensity modulation at some point following the phase modulator. This process can introduce distortion. Also the optical path between the phase modulator and the photodetector must be phase stable, which can be hard to realize in practice.

Hence the more common approach to realizing linear modulation is to convert the phase modulation into intensity modulation right in the modulator itself. A common modulator that includes the phase-to-intensity conversion uses a Mach-Zehnder (MZ) interferometer. Depending on the degree of linearity required, an MZ modulator may be sufficiently linear to meet the needs of the application.

In demanding applications where lower levels of distortion are required than is possible to achieve with a single MZ modulator, a variety of so-called linearized modulators have been developed. See, for example, Cox, Charles H. III, *Analog Optical Links, Theory and Practice*, Cambridge University Press, Cambridge, UK, 2004, section 6.4.2, pp. 240-249, FIG. 6.20, which is incorporated herein by reference, for a representative survey. Modulators linearized via optical, as opposed to electrical, techniques often consist of two MZ modulators connected in series or in parallel. By designing a different sensitivity for each of the MZ interferometers, it is possible to have greater suppression of the distortion than of the desired signal, thereby achieving more linear operation. To maximize suppression of the nonlinear distortion products, the input electrical signal is divided into two components that must be applied to the electrodes of the two MZs with a precise amplitude and phase relationship. It has proved difficult to realize and maintain this precise relationship across a broad range of input signal frequencies.

A practical way to achieve a precise split over frequency is to have one physical modulator that actually contains two "logical" modulators. As will be shown below, for a link whose performance is dictated by the parameters of commercially available semiconductor lasers and high-speed photodetectors, the optimum ratio of modulator sensitivities is ~2. By using two wavelengths (see Ackerman, Edward, "Linearization of a Broadband Analog Optical Link Using Two Wavelengths", U.S. Pat. No. 6,246,500, which is incorporated herein by reference) or two polarizations (See Johnson, L. M. and Roussell, H. V., Reduction of intermodulation distortion in interferometric optical modulators, *Opt. Lett.*, vol. 13, pp. 928-930, which is incorporated herein by reference), it has been shown to be possible to have different sensitivities for each wavelength or polarization, thereby achieving some degree of improved linearity. However, it has been found that the amount of linearity improvement is limited in these techniques by the limitation in the ratio of the sensitivities in the two logical modulators. For example, using two polarizations, the ratio of sensitivities is determined by the r33 for each polarization of the electro-optic material within which the modulator is fabricated; for lithium niobate, which is a common material, the sensitivity ratio is invariant at ~3, which is greater than the optimum sensitivity ratio. It might initially appear that a sensitivity closer to the optimum value could be achieved using different wavelengths. But in practice the difference in wavelength is bounded by the wavelengths in common usage and the wavelength range over which the waveguides remain single-mode. Using the two wavelengths that readily satisfy both these constraints, 1.3 and 1.55 µm, yields a sensitivity ratio of 1.19, which is significantly less than the optimum ratio.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

One aspect of the present teaching is to teach a new linearization technique that can permit a wider range of sensitivities than has been possible to achieve with prior art linearization techniques. Another aspect of the present teaching to have the sensitivity ratio remain constant over frequency thereby permitting improved linearity over a wide frequency range.

Inherently broadband linearized electro optic modulators of the present teaching utilize optical waveguides configured as two separate Mach-Zehnder interferometers situated relative to a single set of electrodes such that an electric field imposed by a time-varying signal applied to the single set of electrodes affects properties of the optical waveguides in both the Mach-Zehnder interferometers. In some embodiments, the linear electro-optic effect (Pockels effect) is the primary means by which the signal applied to the single set of electrodes affects properties of the optical waveguides in the two Mach-Zehnder interferometers. In some embodiments, carrier injection is the primary means by which the signal applied to the single set of electrodes affects properties of the optical waveguides in the two Mach-Zehnder interferometers. In various embodiments, the device may be fabricated in an inorganic material, lithium niobate, including Z-cut and X-cut lithium niobate, a semiconductor material, including silicon, gallium arsenide, and InGaAsP, or an organic material, including a polymer material.

Figure 1A:
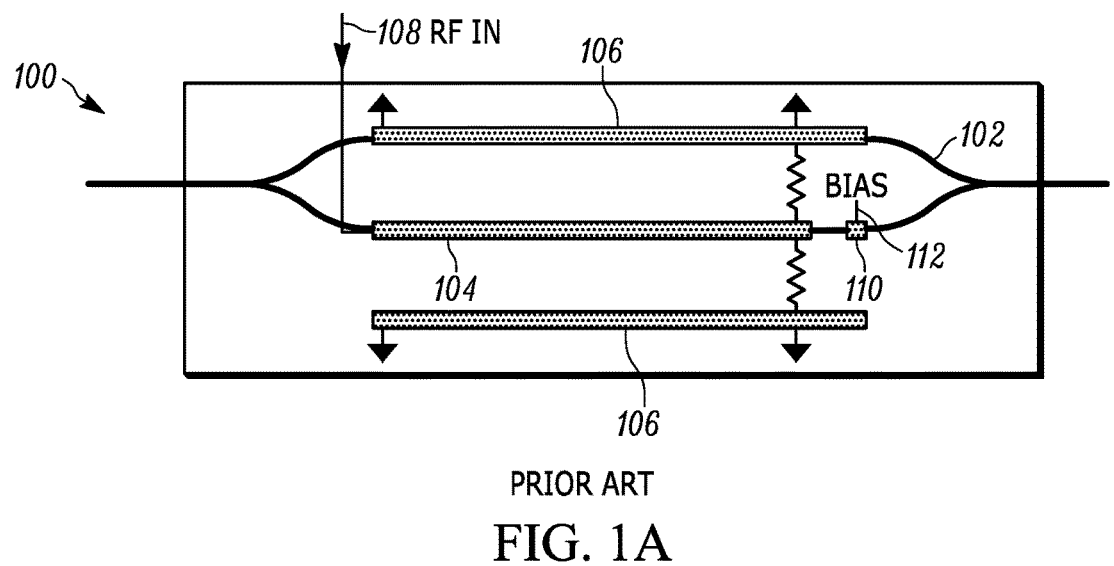
FIG. 1A illustrates a prior art electro-optic modulator realized using a Mach-Zehnder interferometer.

FIG. 1A shows a diagram of a Mach-Zehnder (MZ) modulator 100. The black lines represent single-mode optical waveguides 102 and the grey rectangles represent the electrodes 104, 106. A signal electrode 104 is connected to an RF input 108. One or more ground electrodes 106 is connected to a ground. RF modulation is supplied at the RF input 108 to RF modulate the optical carrier by the electric field between the electrodes 104, 106 that in an electro-optic material is coupled to the optical field via r33, which is the electro-optic tensor of the material. A common electro-optic material is lithium niobate. Either the horizontal or vertical component of the electric field can impart modulation depending on whether X-cut or Z-cut lithium niobate, respectively, is used. The sketch in FIG. 1A assumes that Z-cut material is being used. The electrode configuration consists of three, parallel electrodes, Ground-Signal-Ground (GSG), with the width of, and spacing between, the electrodes selected to satisfy the design constraints of a coplanar strip type of electrode. Note that in the standard electrode-waveguide configuration, there is no optical waveguide for the electric field between the signal electrode and one of the ground electrodes to modulate. The MZ modulator is biased using a bias electrode 110 that is connected to an electrical bias source 112.

Figure 1B:
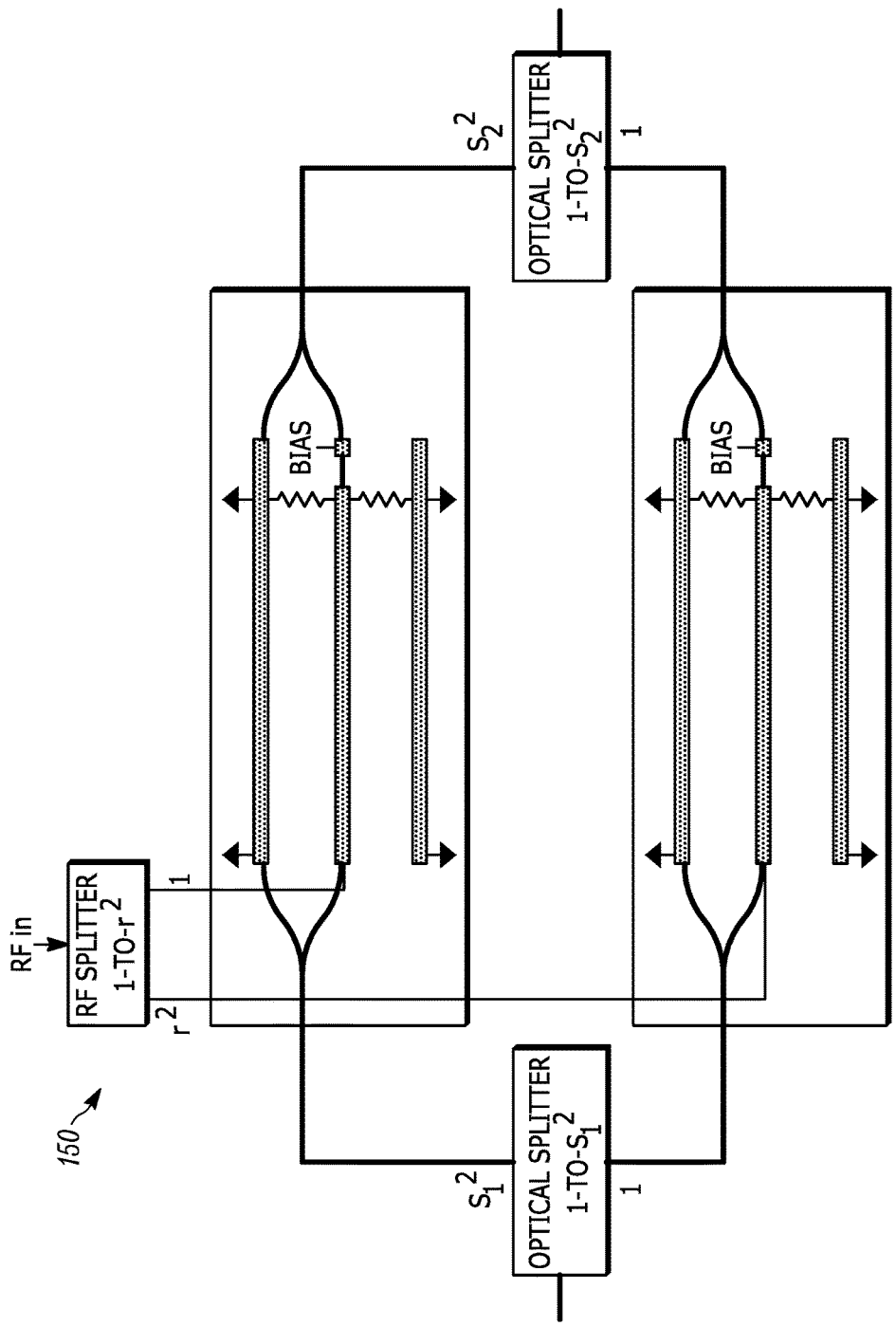
FIG. 1B illustrates a prior art linearized modulator comprising two Mach-Zehnder (MZ) modulators connected in parallel.

FIG. 1B shows a sketch of a prior art linearized modulator 150 that consists of two MZs connected in parallel. To achieve improved linearity relative to a single MZ, the bias of each of the parallel connected MZs must be carefully maintained. Since the bias applies to all frequencies, frequency dependence of the bias is not an issue. However, the amplitude and phase relationship between the RF signals that are applied to the two MZ's electrodes needs to be constant over frequency, and this has proved to be a challenge to realize in practice. Note that in the standard dual-parallel MZ modulator there is no constraint on the separation distance between the two, individual MZ interferometers. For example, it is often common practice to implement prior art dual-parallel linearized modulators using two, separately-packaged MZ modulators.

Figure 2A:
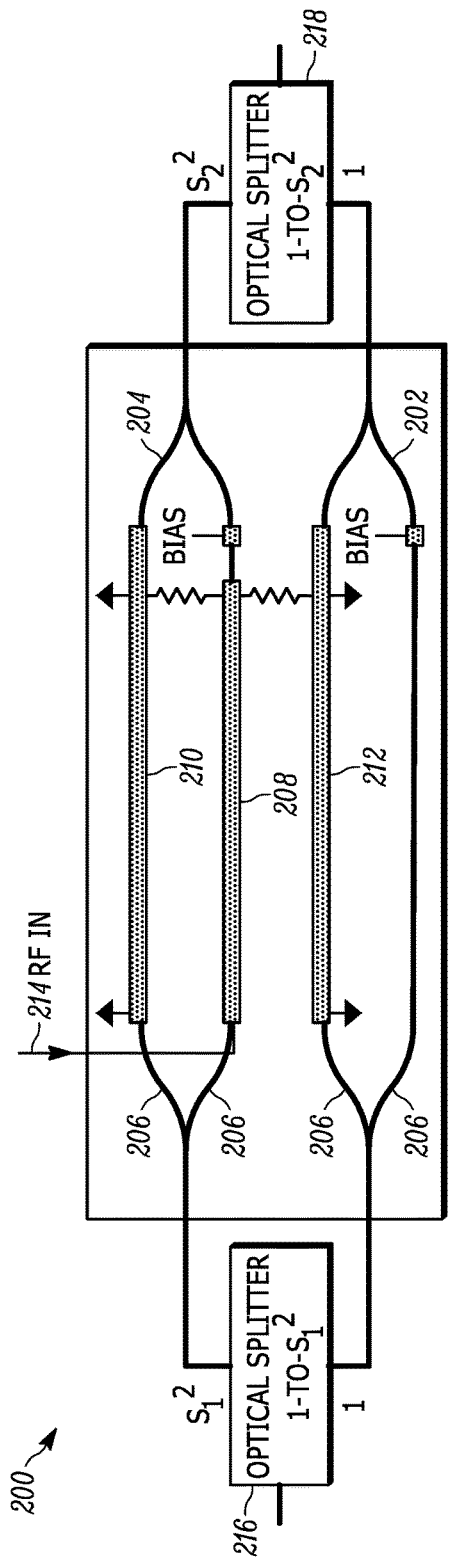
FIG. 2A illustrates a linearized modulator of the present teaching applied to two parallel MZ interferometers realized in Z-cut lithium niobate.

FIG. 2A shows a diagram of an embodiment of the linearized modulator 200 of the present teaching implemented using two MZ interferometers 202, 204 in Z-cut lithium niobate. In the figure are shown the optical waveguide portions 206 of two MZs, arranged in a dual-parallel configuration. However, unlike in all known prior art dual-parallel MZ modulators, there is only one set of GSG electrodes 208, 210, 212. The signal electrode 208 and one of the ground electrodes 210 of this one set of GSG electrodes 208, 210, 212 modulates a first MZ 204 of the dual-parallel MZs 202, 204 as it would in a conventional MZ modulator. However, unlike prior art modulators, the optical waveguide 206 of the second MZ 202 is positioned to lie under the second ground electrode 212 of the single GSG electrode configuration. Hence the single GSG electrode structure imposes modulation across the optical waveguides of two MZ interferometers, thereby utilizing all the electrical fields imposed by the RF signal fed from an RF input 214 to this GSG electrode structure. While the modulation efficiency, as measured by the overlap integral between the electrical and optical fields, may change with frequency, the ratio of the modulation efficiencies in the two MZs will remain constant with frequency because the frequency dependence of the modulation efficiency is dictated by the frequency-dependent attenuation of the RF signal as it propagates along the single set of GSG electrodes. Thus, one aspect of the present teaching is to have the sensitivity ratio remain constant over frequency, thereby permitting improved linearity over a wide frequency range.

The linearized modulator 200 also includes an optical splitter 216 that serves to supply an optical signal to the waveguides 206 that make up the two MZ modulators 202, 204 and an optical combiner 218 that serves to combine the outputs of the two MZ modulators 202, 204 to a modulator output. The electrical signals to be applied to the linearized modulator 200 are generated by a signal generator and applied to the signal electrode 208 via the RF Input 214.

Figure 2B:
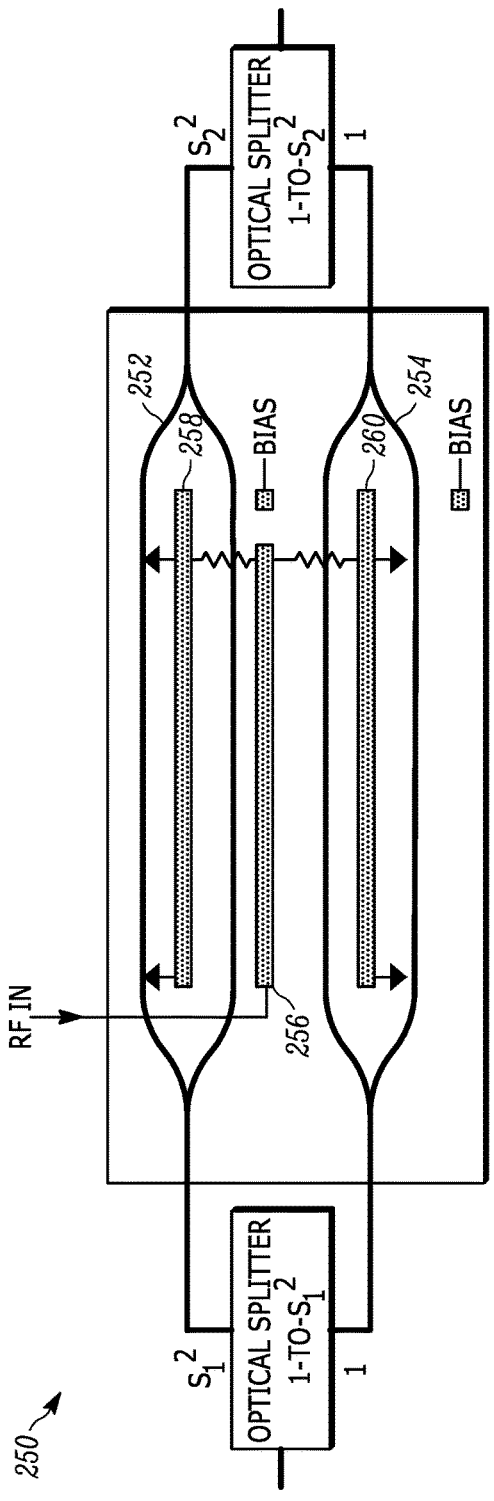
FIG. 2B illustrates a linearized modulator of the present teaching applied to two parallel MZ interferometers realized in X-cut lithium niobate.

FIG. 2B shows an embodiment of a linearized modulator 250 implemented using two MZs 252, 254 in X-cut rather than Z-cut lithium niobate. As suggested by the figure, to realize a different sensitivity in the two MZ interferometers, the signal electrode 256 is closer to the ground electrode 258 of the first MZ 252 than it is to the ground electrode 260 of the second MZ 254.

Figure 3:
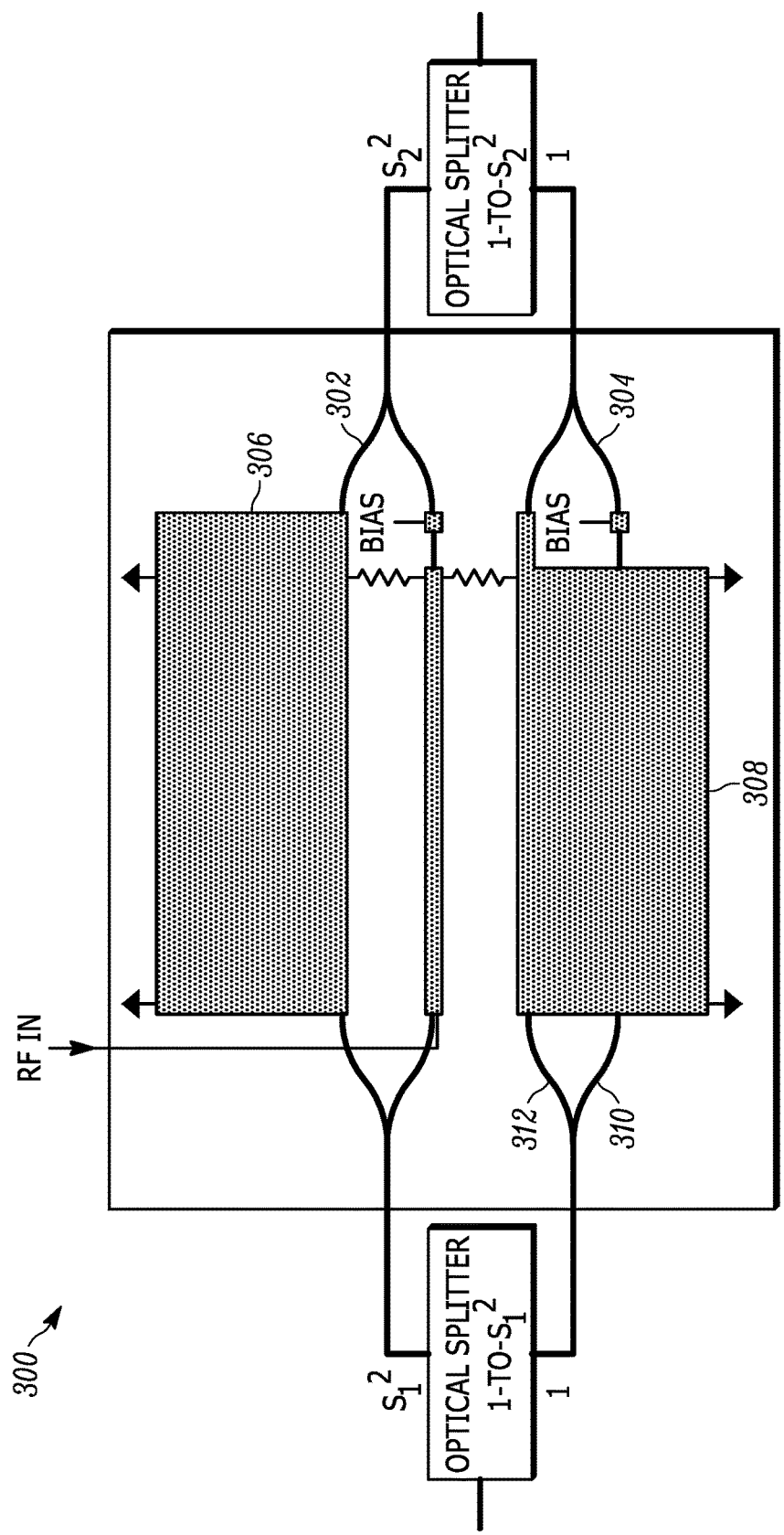
FIG. 3 is an alternative design of the modulator shown in FIG. 2A on Z-cut lithium niobate where the ground electrodes are wide enough that the second ground electrode extends over both of the optical waveguides of the second MZ interferometer.

FIG. 3 shows a linearized modulator 300 that uses an embodiment of a design of the GSG electrodes of the present teaching. The linearized modulator 300 utilizes a first MZ 302 and second MZ 304. In this embodiment, the MZ's 302, 304 are fabricated on Z-cut lithium niobate. Also, in this embodiment, the ground electrodes 306, 308 are wide enough that the second ground electrode 308 extends over both of the optical waveguides 310, 312 of the second MZ 304. It might appear that this would cancel out the modulation of the second MZ 304, since it might appear that the same modulation would be imposed on both of the optical waveguide arms of the second MZ 304. However, the field strength falls off rapidly with distance from the signal electrode. Hence the field that is imposed on the outer optical waveguide 310 of the second MZ interferometer 304 is substantially weaker than the field that is applied to the inner optical waveguide 312 of the second MZ 304. Therefore, this slight degradation in the field can be tolerated by taking this factor into account when designing the modulation sensitivity ratio.

Many of the key performance measures of any electro-optic modulator are RF performance measures. The prime RF performance measures include noise figure (NF) and spurious-free dynamic range (SFDR). To make such RF measurements on the novel broadband linearized modulator requires its incorporation into an RF photonic link (hereafter referred to as a "link"). In selecting a link topology in which to use any dual-parallel MZ modulator it is important to keep in mind that the outputs of the two modulators must be converted into photocurrents that are added to, or subtracted from, one another. It is possible to use two photodetectors, connected in a balanced configuration, to combine the signals fed to them by the two outputs of the linearized modulator. Using two photodetectors, however, has two disadvantages. One is that each photodetector will have its own frequency response, which would re-introduce the difference in the frequency response of the two paths that was deliberately avoided in the design of the two-MZ linearized modulator with a single set of GSG electrodes. Another disadvantage of using a balanced photodetector is that two fibers of equal electrical length are required between the modulator output and the photodetector input.

An alternative arrangement that addresses both these disadvantages is to use two wavelengths, one feeding each modulator of the dual-parallel MZ modulator. The outputs of the two MZ interferometers can be combined and fed to a single photodetector over a single fiber using a wavelength division multiplexer (WDM). This yields the same result as adding the photocurrents from separate photodetectors each illuminated by one of the MZ modulator outputs, provided that the two optical carriers differ in frequency by an amount greater than the bandwidth of the single photodetector.

Figure 4:
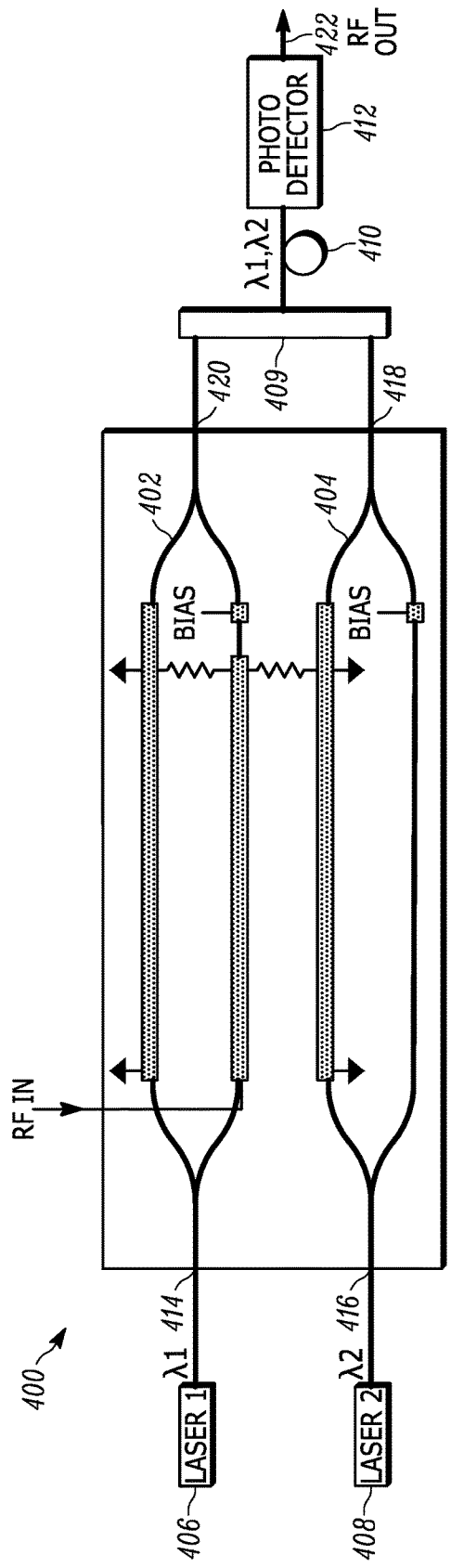
FIG. 4 illustrates an embodiment of the inherently broadband linearized modulator with customizable performance where optical power is supplied to the two MZs using two lasers that have different wavelengths so that they can be efficiently multiplexed after modulation using a wavelength-division multiplexer (WDM) into a single fiber for illumination of a single photodetector.

FIG. 4 illustrates an embodiment of the inherently broadband linearized modulator with customizable performance in a link 400. The optical power is supplied to the two MZs 402, 404 using two lasers 406, 408 that have different wavelengths so that they can be efficiently multiplexed, using a wavelength-division multiplexer (WDM) 409 after modulation into a single fiber 410 for illumination of a single photodetector 412. Hence for the link 400 embodiment shown in FIG. 4, the optical inputs 414, 416 to the modulator are shown being supplied with light from lasers 406, 408 whose optical outputs differ in frequency by perhaps a few hundred GHz and the optical outputs 418, 420 are shown feeding a WDM 409 that allows a single photodetector 412 to convert the total of the two modulated optical carriers back into a single electrical signal 422. By combining the outputs 418, 420 of the two MZ interferometers 402, 404 onto a single detector 412, one eliminates the introduction of this potential frequency response difference. It is important to note that the use of two wavelengths being taught here—multiplexing the two MZ outputs 418, 420 onto a single fiber 410—is fundamentally different than the prior art use of two wavelengths, in which two wavelengths that differed by many THz were used to achieve a desired sensitivity ratio.

Expressions for the NF and SFDR of the link architecture in FIG. 4 can be derived in the same manner as in Cox, Charles H. III, *Analog Optical Links, Theory and Practice*, Cambridge University Press, Cambridge, UK, 2004, section 6.4.2, pp. 240-249. Third-order distortion products are minimized when the two lasers' optical powers ($P_L$'s) and the two MZ interferometers' $V\pi$'s and bias points ($\phi$'s) are related as follows:

$$P_{L2} = -P_{L1} \frac{\sin\varphi_1}{\sin\varphi_2} \left(\frac{V_{\pi 2}}{V_{\pi 1}}\right)^3. \quad (1)$$

When this relationship is established, $$NF = 10\log\left[kT + kT + \frac{(2q[I_{D1} + I_{D2}] + I_{D1}^2 RIN_1 + I_{D2}^2 RIN_2)R_0}{4kTg}\right], \quad (2)$$

where q is the electronic charge, $RIN_{1,2}$ is each laser's relative intensity noise, k is Boltzmann's constant, T=290 K (according to the definition of noise figure, see H. Haus, et al., "IRE standards on methods of measuring noise in linear twoports, 1959," *Proc. IRE, vol.* 48, pp. 60-68, January 1959, which is incorporated herein by reference), $R_0$=50Ω, and the dc photocurrent components imposed by lasers 1 and 2 and the link's gain are, respectively:

$$I_{D1} = \frac{r_d t_{ff}}{2} P_{L1}(1 + \cos\varphi_1); \; I_{D2} = \frac{r_d t_{ff}}{2} P_{L2}(1 + \cos\varphi_2); \quad (3a, 3b)$$

$$\text{and } g = \left[\frac{\pi r_d t_{ff} R_0}{4 V_{\pi 1}} P_{L1} \sin\varphi_1 \left(1 - \left[\frac{V_{\pi 2}}{V_{\pi 1}}\right]^2\right)\right]^2. \quad (4)$$

In expressions (3) and (4), $r_d$ is the responsivity of the resistively matched photodetector and $t_{ff}$ is the total optical insertion loss of the modulator, optical fibers, and WDM.

The expressions for spurious-free dynamic range (SFDR) depend on whether second-order distortion products are minimized at the same time as the third-order distortion products. If the MZ interferometers are biased at complementary quadrature points (i.e., $\phi_1 = 90°$ and $\phi_2 = -90°$, or vice versa), or if an input RF bandpass filter limits input signals to within one octave, then the link's SFDR is limited by the minimized $3^{rd}$-order distortion products to $$SFDR = \frac{4}{5}[IP3_{in} - (-174 \text{ dBm/Hz}) - NF], \quad (5)$$

where $$IP3_{in} = 4\sqrt{\frac{3}{5} \frac{V_{\pi 1} V_{\pi 2}}{\pi^2 R_0}}. \quad (6)$$

If the input signals are allowed to span more than one octave—i.e., not limited to less than one octave by an input RF bandpass filter—then the above equations predict the SFDR if the MZ interferometers are both biased at quadrature. If, however, they are not biased at quadrature, $2^{nd}$-order distortion products can be minimized along with the $3^{rd}$-order distortion products if, in addition to the condition stipulated in (1), $$\tan\varphi_2 = \frac{V_{\pi 2}}{V_{\pi 1}} \tan\varphi_1. \quad (7)$$

With both (1) and (7) established, at non-quadrature values of $\phi_1$ and $\phi_2$, the SFDR is limited by the minimized $2^{nd}$-order distortion products to $$SFDR = \frac{3}{4}[IP2_{in} - (-174 \text{ dBm/Hz}) - NF], \quad (8)$$

where $$IP2_{in} = \frac{2V_{\pi 1}^2}{\pi^2 R_0}\left[\left(\frac{V_{\pi 2}}{V_{\pi 1}}\right)^2 \tan\varphi_1\right]^{\frac{2}{3}}. \quad (9)$$

Figure 5:
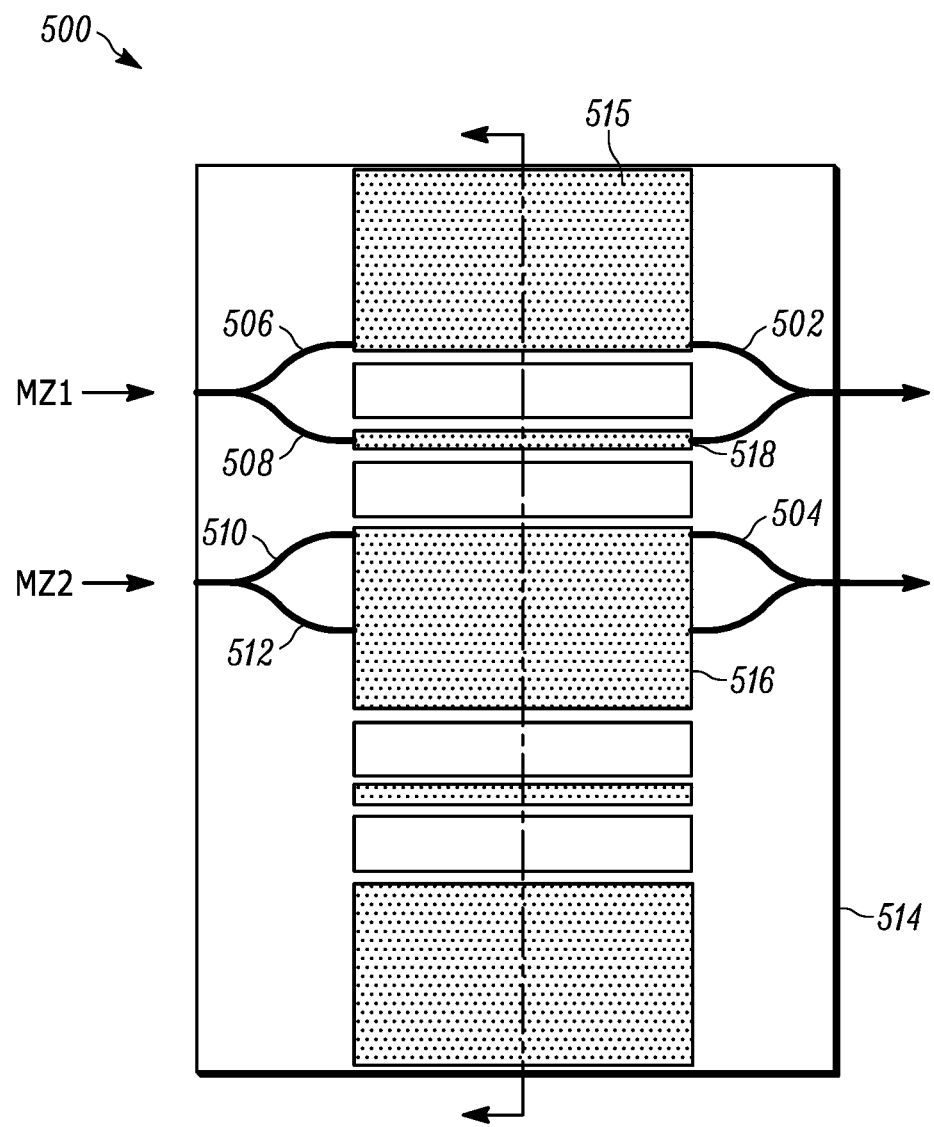
FIG. 5 illustrates a diagram of a top view of the layout of an embodiment of optical waveguides and electrodes of an inherently broadband linearized modulator of the present teaching.

FIG. 5 illustrates a diagram of a top view of the layout of an embodiment of an inherently broadband linearized modulator 500 of the present teaching. The modulator 500 of the present teaching was designed for use in an experiment to demonstrate its inherently broadband linearized performance. One feature of this embodiment is that it has the exact same electrode design as two conventional MZ modulators. As a result, it is expedient and inexpensive to fabricate using an existing electrode mask. The modulator 500 has a first MZ 502 and a second MZ 504. The first MZ 502 has two optical waveguides 506, 508, and the second MZ 504 has two optical waveguides 510, 512. The substrate 514 is made from lithium niobate material. There is a first ground electrode 515 that covers the outer waveguide 506 for the first modulator 502 and a second ground electrode 516 that covers both waveguides 510, 512 of the second MZ 504. There is one signal electrode 518. The difference between the layout shown in FIG. 5 and the layout of conventional MZ modulators is in the optical waveguide layer. Ordinarily, the optical waveguides labeled "MZ 2" would be situated identically to how those labeled "MZ 1" are situated—i.e., with the upper arm of the interferometer underneath the lower edge of the wide ground electrode in the center of the diagram and with the lower arm underneath the narrower "signal" electrode in the lower half of the diagram—and two separate conventional MZ modulators would be fiber-pigtailed in separate packages after this one piece of lithium niobate was to be cut in half horizontally. In FIG. 5, the optical waveguides 510, 512 of the second MZ modulator 504 have been translated so that they are both underneath the central ground electrode 516.

After the single device whose layout is shown in FIG. 5 was fiber-pigtailed and packaged, it was used in a link with the configuration shown in FIG. 4, with two semiconductor lasers, a wavelength-division multiplexer, and a high-speed photodetector.

Figure 6:
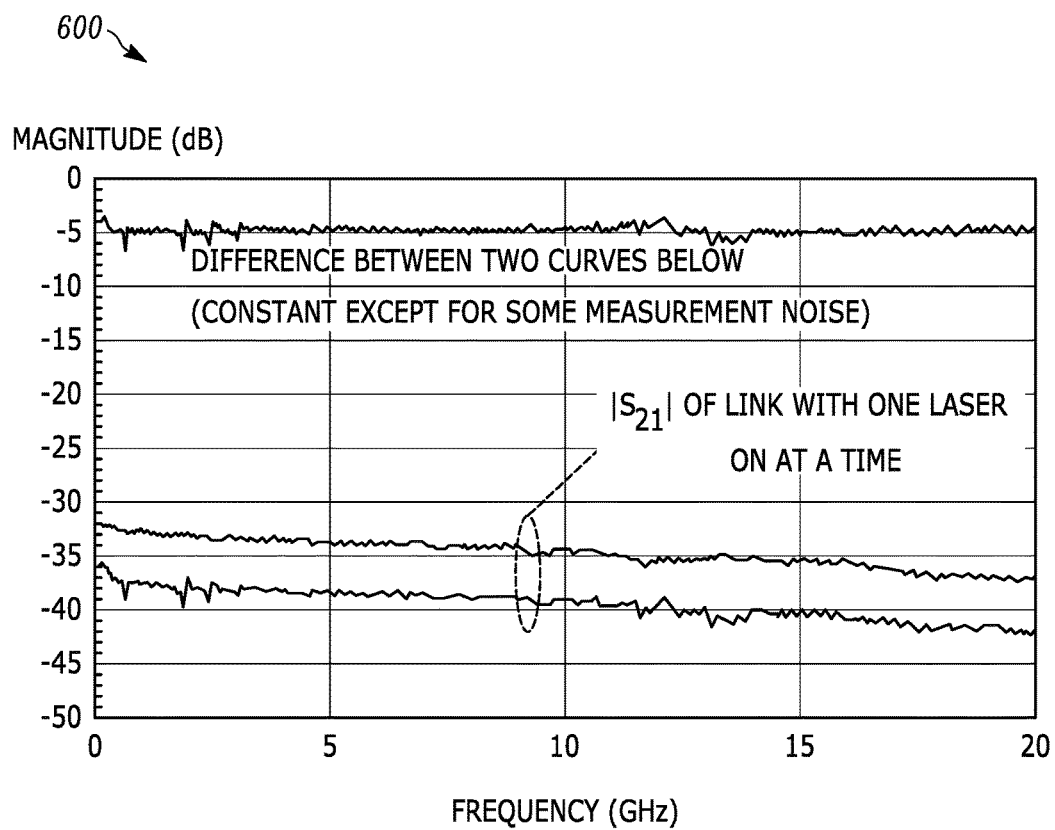
FIG. 6 illustrates a measured $S_{21}$ for the link configuration in FIG. 4 with one laser on at a time, which confirms that the ratio of Vπ's in the two MZs is not a function of frequency.

FIG. 6 illustrates a graph 600 showing measured $S_{21}$ for the link configuration in FIG. 4 with one laser on at a time, which confirms that the ratio of $V\pi$'s in the two MZs is not a function of frequency. If the $V\pi$ ratio were a function of frequency, the two curves would not differ by a constant number of dB like what is shown by the uppermost curve, and it would thus not be possible to achieve broadband linearization. FIG. 6 shows the gain ($=20 \log|S_{21}|$) of this link with one laser on at a time, which was measured first just to be certain that the gains would "track" one another—i.e., that the extent to which the two MZ interferometers' $V\pi$'s varied with frequency was identical, which is the only way to achieve linearization across a broad bandwidth and which only two linearization approaches have ever successfully achieved (albeit without the customizable $V\pi$ ratio enabled by the approach taught by the present teaching. See U.S. Pat. No. 6,246,500, to Ackerman, Edward entitled "Linearization of a Broadband Analog Optical Link Using Two Wavelengths"; and Johnson, L. M. and Roussell, H. V., Reduction of intermodulation distortion in interferometric optical modulators, *Opt. Lett.*, vol. 13, pp. 928-930). The two $S_{21}$ curves (the lowermost two of the three curves in the figure) are extremely similar in shape, enabling broadband linearization using this modulator. The third curve is the mathematical difference between the two $S_{21}$ curves.

For the measurement of the broadband linearized link and comparison to a conventional MZ modulator-based external modulation link with the same modulator $V\pi$ and optical power level, results were obtained as follows. Both interferometers in the broadband linearized modulator were maintained near their quadrature bias points, where all even-order distortion is minimized, but on opposite slopes—i.e., at 90° and −90°—so that their outputs subtract from one another at the single photodetector. The optical power into the "lower" interferometer shown in the diagram in FIG. 4 corresponded to 2.8 mA of photocurrent. Using two input RF signal tones—first near 2 GHz, and then near 10 GHz—and observing those fundamental tones plus the third-order intermodulation distortion products on a spectrum analyzer screen, the optical power into the "upper" interferometer was varied until the intermodulation distortion power was minimized. At this ratio of powers, the third-order intermodulation distortion products were observed to increase by 5 dB rather than the conventional 3 dB for every 1 dB increase in the fundamental input RF signal tones, indicating that this was the correct optical power ratio for linearization as predicted by.

Figure 7:
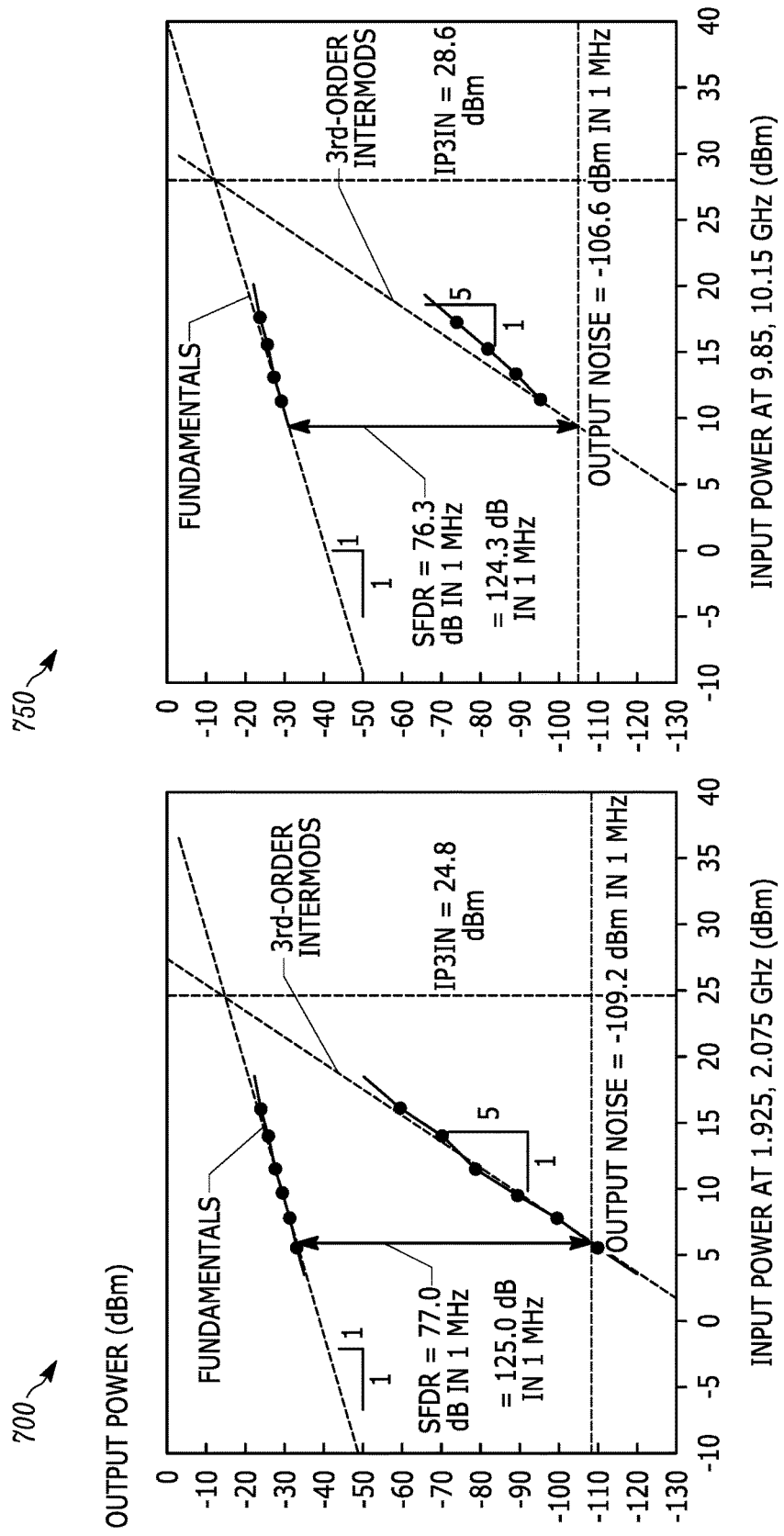
FIG. 7 illustrates a measured data obtained from output noise and two-tone intermodulation distortion experiments performed on the link described in FIG. 4 using the first fabricated broadband linearized modulator of the present teaching.

For input fundamental frequencies of 1.925 GHz and 2.075 GHz, the lefthand plot 700 in FIG. 7 shows the measured output power at the fundamental frequencies and the strongest $3^{rd}$-order intermodulation distortion frequencies (1.775 GHz and 2.225 GHz), and the measured output noise power, from which a noise figure of 44 dB and SFDR of 125.0 dB·$Hz^{4/5}$ are calculated. Similarly, the righthand plot 750 shows the same measurements for input fundamental frequencies of 9.85 GHz and 10.15 GHz, which were performed without changing bias points or optical power levels in the link, and from which a noise figure of 48 dB and SFDR of 124.3 dB·$Hz^{4/5}$ was calculated. By way of comparison, a link using a conventional MZ modulator with the same Vπ as the lower-Vπ MZ of the two MZs in the linearized modulator, and with the same dc photocurrent and laser RIN, would be predicted to have a noise figure of 28-31 dB and a SFDR of 109-110 dB·$Hz^{2/3}$ across this same range of frequencies.

Figure 8:
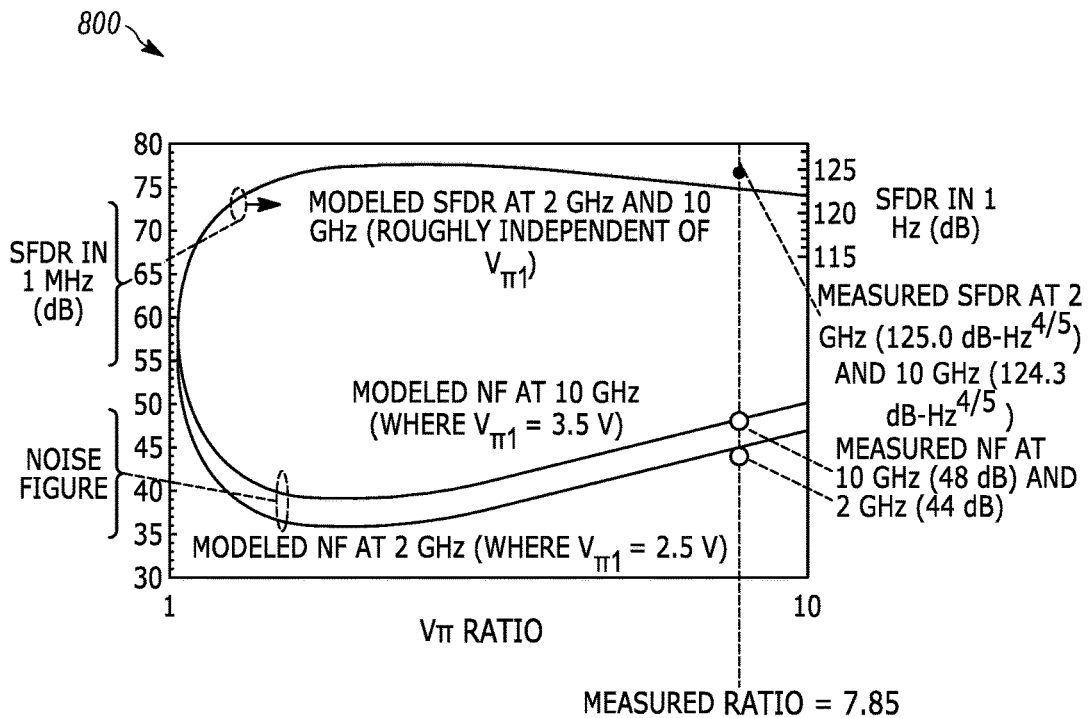
FIG. 8 illustrates a noise figure (NF, lower two curves) and spurious-free dynamic range (SFDR, upper curve) for the link whose configuration is shown in FIG. 4.

FIG. 8 illustrates a chart 800 showing noise figure (NF, lower two curves) and spurious-free dynamic range (SFDR, upper curve) predicted using equations (1)-(6) for the link whose configuration is shown in FIG. 4, and using the following experimentally measured data for the link's components: $I_{D1}$=2.8 mA, $V\pi_1$=2.5 V at 2 GHz and 3.5 V at 10 GHz, $RIN_{1,2}$=−163 dB/Hz at both frequencies. Measured data are shown for the experimental link assembled from these components and the modulator described in FIGS. 4-6, which had a measured Vπ ratio of 7.85.

For the link whose measured data are given in FIG. 7, FIG. 8 compares these data—shown as circles situated over the point on the x-axis corresponding to the measured Vπ ratio of 7.85 for the modulator diagrammed in FIG. 5—to the performance predicted by equations (1)-(6) using the following experimentally measured data for the link's components: $I_{D1}$=2.8 mA, $V\pi_1$=2.5 V at 2 GHz and 3.5 V at 10 GHz, $RIN_{1,2}$=−163 dB/Hz at both frequencies. For the calculated performance, the Vπ ratio (i.e., $V\pi_2/V\pi_1$) was varied to determine how much better the measured performance might have been had the Vπ ratio been carefully customized rather than allowed to fall at whatever ratio resulted from the quick and inexpensive modification of two conventional modulators as explained in the text describing FIG. 5—in this case, a measured ratio of 7.85. With no other change to the components, if the customizability of this approach had been exploited to achieve a Vπ ratio closer to the ideal value of ~2, equations (1)-(6) indicate that, if both MZs were again biased at opposite-slope quadrature points, the measured NF would likely have been ~9 dB lower and the SFDR would have been ~2.5 dB higher than what was measured for the fabricated device with its measured Vπ ratio of 7.85.

Figure 9:
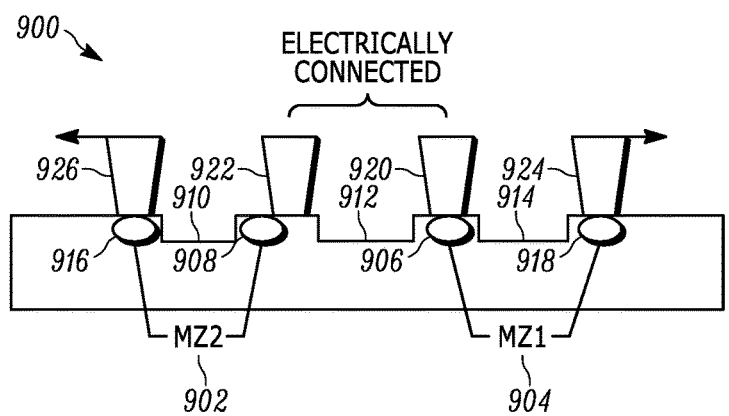
FIG. 9 illustrates an embodiment of a broadband linearized modulator of the present teaching in which the ratio of $V\pi$'s in the two MZ's is customized by varying the degree to which the center of one of the two centermost optical waveguides is offset from the center of electrode situated above it.

One feature of the present teaching is the ability to customize a ratio of Vπ. For example, an inherently broadband linearized modulator of the present teaching has been designed with a customized Vπ ratio of 2. FIG. 9 illustrates an embodiment of a broadband linearized modulator 900 of the present teaching in which the ratio of Vπ's in the two MZ's 902, 904 is customized by varying the degree to which the center of one of the two centermost optical waveguides 906, 908 is offset from the center of an electrode 920, 922 situated above it.

The substrate material can be any electro-optic material, although the embodiment of FIG. 9 is most applicable to a lithium niobate substrate in which three trenches 910, 912, 914 can be ion-milled and in which the four optical waveguides 906, 908, 916, 918 that comprise the two parallel interferometers 902, 904 can be realized using one of several well-established methods. One input RF signal is applied simultaneously to the two center electrodes 920, 922 atop the two centermost optical waveguides 906, 908, which are electrically connected to one another such that a cross-sectional view at a different position in the device would show a single electrode between the two outer ground electrodes 924, 926. The Vπ of Mach-Zehnder interferometer 2 (MZ 2 902 in the figure) can in principle be customized to be any factor between 1 and infinity greater than the Vπ of MZ 1 904 by varying the degree to which the center of the optical waveguide 908 below the lefthand "signal" electrode 922 is offset from the center of electrode 922 above the waveguide 908. Significantly, Vπ of MZ 2 902 can be readily designed to be a factor of ~2 greater than that of MZ 1 904. This ratio of Vπ was shown from the data in the chart 800 of FIG. 8 to yield the optimum performance when used in a link assembled from commercially available lasers, WDM, and photodetector.

The modulator whose cross-section is shown in FIG. 9 is projected to have a Vπ of 1 V at 1 GHz and 2 V at 20 GHz for MZ 1, and twice these voltages for MZ 2. According to equations (1)-(6), substituting such a modulator for the one used in the link with the measured performance shown in FIG. 7 and again biasing both MZ at quadrature would have yielded a noise figure of 25 dB at 1 GHz that would increase gradually to about 31 dB at 20 GHz, and the expected SFDR would be approximately 127.5 dB·$Hz^{4/5}$ across the entire 1-20 GHz band.

Figure 10:
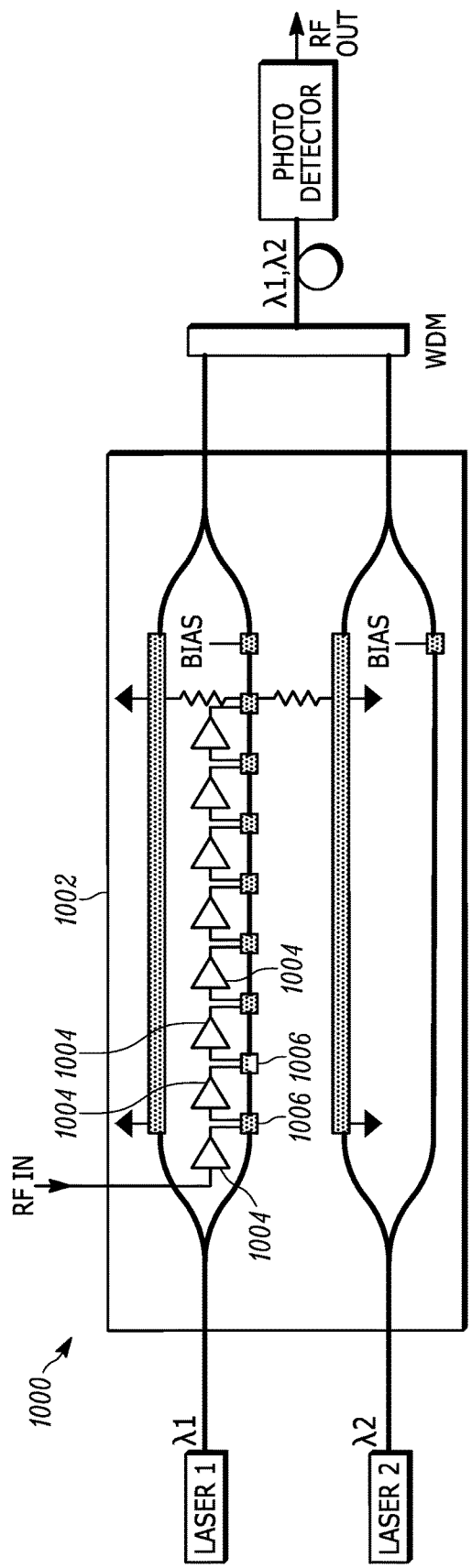
FIG. 10 illustrates an embodiment of the link configuration in FIG. 4 in which the center signal electrode of the broadband linearized electro-optic modulator of the present teaching is formed by a plurality of electrode segments connected to one another in a series configuration that includes gain elements, and that results in improvements to both the link's sensitivity and the flatness of its frequency response.

It is also possible to realize performance improvements by distributing gain elements along the modulator's traveling-wave electrode structure. FIG. 10 illustrates a schematic view of an optical link 1000 using an inherently broadband linearized MZ modulator 1002 of the present teaching that increases both the sensitivity and the flatness of the frequency response of the link 1000 by distributing a plurality of gain elements 1004 along a length of the traveling-wave electrodes of the MZ modulator 1002. In one embodiment, each of the gain elements 1004 is a relatively low-gain amplifier that is electrically connected between two adjacent electrode segments 1006 as shown in FIG. 10. By properly selecting the gain of the individual amplifiers 1004, it is possible to achieve a greater range of combinations of desired link sensitivity (as characterized by its noise figure, NF) and dynamic range than in the case without gain elements distributed along the modulator electrodes. Additionally, because ohmic and radiative losses in a modulator's electrically long traveling-wave electrodes are a principal cause of "roll-off" in the frequency response of an analog optical link, the addition of gain elements 1004 between shorter electrode segments 1006 can significantly flatten the frequency response of the MZ modulator 1002 compared to the case without gain elements distributed along the electrodes.

Although all measured and modeled link results using the broadband linearized modulator have so far been discussed only for the case where both modulators are biased at quadrature, it is possible using the same equations to predict the performance when a modulator of the present teaching is used in a link with one or both MZ's biased away from quadrature, which can yield even better performance in some cases. For example, in a link that only needs to operate across a one-octave bandwidth—e.g., 10-20 GHz—the equations given above predict that the modulator described in FIG. 9, used with the same commercially available semiconductor lasers, WDM, and photodetector as were used in the experiment described above, would have a noise figure of <10 dB and an SFDR of ~145 dB·Hz$^{4/5}$ across this band if the dc photocurrent generated by light from MZ 1 were 98 µA with MZ 1 "low-biased" at 170° and if the dc photocurrent generated by light from MZ 2 were 2.4 mA with MZ 2 "low-biased" at −150°. Although 10-20 GHz is only a single octave, prior art linearized modulators that require splitting of the input RF signal for application to two separate modulators would unlikely yield linearized performance at both ends of this bandwidth because of the difficulty in maintaining a frequency-invariant amplitude and phase relationship between the signal applied to the two separate modulators. The example described in this paragraph illustrates how the link performance can be customized—and in this case, optimized—using the broadband linearized modulator of the present teaching.

In some embodiments, a single dc bias voltage is multiplexed together with the time-varying signal using a bias tee, and both the single dc bias voltage and the time-varying signal are applied to the single set of GSG electrodes to affect both Mach-Zehnder interferometers. In some embodiments, two separate dc bias voltages are applied to the two Mach-Zehnder interferometers using bias electrodes that are separate from the single set of electrodes to which the time-varying signal is applied.

In some embodiments, the signal electrode is situated above one arm of one of the Mach-Zehnder interferometers, one of the ground electrodes is situated over the other arm of this same Mach-Zehnder interferometer, and both optical waveguide arms of the second Mach-Zehnder interferometer are situated under the second, wide, ground electrode.

In some embodiments, the signal electrode is situated above one arm of one of the Mach-Zehnder interferometers, one of the ground electrodes is situated over the other arm of this same Mach-Zehnder interferometer, and only one of the optical waveguide arms of the second Mach-Zehnder interferometer is situated under the second, narrow, ground electrode.

In some embodiments, the position of the optical waveguides in the first of the two Mach-Zehnder interferometers relative to the single set of GSG electrodes and the position of the optical waveguides in the second of the two Mach-Zehnder interferometers relative to the single set of electrodes are chosen such that an electrical signal applied to the single set of electrodes affects properties of the optical waveguides in the first Mach-Zehnder interferometer with a different efficiency than it affects properties of the optical waveguides in the second Mach-Zehnder interferometer.

In some embodiments, the two different efficiencies with which the one electrical signal affects properties of the optical waveguides in the two Mach-Zehnder interferometers are expressed using the figure of merit referred to as "Vπ", which is well known in the art The Vπ of the first Mach-Zehnder interferometer may be different from the Vπ of the second Mach-Zehnder interferometer. The ratio of Vπ's for the two Mach-Zehnder interferometers may be substantially invariant with RF frequency. The frequency-invariant Vπ ratio can be designed to impart predetermined or optimum performance to an RF photonic link using this device as the electro-optic modulator. In some embodiments, the frequency-invariant Vπ ratio is approximately equal to 2.

The optical power supplied to the two Mach-Zehnder interferometers may originate from a single optical source, or may originate from multiple sources. In some embodiments, two optical sources are used that emit light at different optical wavelengths, and the modulated optical output signals from the two Mach-Zehnder interferometers are multiplexed together using a wavelength-division multiplexer and made to illuminate a single photodetector.

In some embodiments, the modulated output signals from the two Mach-Zehnder interferometers are combined optically to illuminate a single photodetector. In some embodiments, the modulated output signals from the two Mach-Zehnder interferometers illuminate two separate photodetectors. These photodetectors may be configured as a balanced photodetector with a single differential output.

In some embodiments, the dc bias voltage or voltages applied to the two Mach-Zehnder interferometers are chosen to result in the quadrature bias points such that no even-order distortion products are generated. The optical power levels supplied to the two Mach-Zehnder interferometers are chosen to result in minimization of $3^{rd}$-order distortion products.

In some embodiments, the dc bias voltage or voltages applied to the non-quadrature bias points for one or both Mach-Zehnder modulators. The optical power levels supplied to the two Mach-Zehnder interferometers are chosen to result in minimization of $3^{rd}$-order distortion products. The optical power levels supplied to the two Mach-Zehnder interferometers may also be chosen to result in minimization of both $2^{nd}$- and $3^{rd}$-order distortion products.

In some embodiments, the electrode of the linearized modulator to which the input RF signal is applied is divided into segments, and gain elements are used to amplify the signal before its application to the electrode segments. This can be performed using either a series or parallel configuration of amplifiers as the gain elements, and can result in improved sensitivity and flatness of link frequency response when compared to the case without distribution of gain along the modulator's traveling wave electrode structure.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A linearized electro-optic modulator comprising:
   a) a first Mach Zehnder interferometer formed on a substrate and comprising a splitter having an input and a first and second output, a first and second optical waveguide, where a respective one of the first and second output of the splitter is optically coupled to a respective input of the first and second optical waveguide, and a combiner having a first and second input, where a respective one of the first and second input of the combiner is optically coupled to a respective output of the first and second optical waveguide; and
   b) a second Mach Zehnder interferometer formed on the substrate and comprising a splitter having an input and a first and second output, a first and a second optical waveguide, where a respective one of the first and second output of the splitter is optically coupled to a respective input of the first and second optical waveguide, and a combiner having a first and second input, where a respective one of the first and second input of the combiner is optically coupled to a respective output of the first and second optical waveguide;

c) a signal electrode positioned on the substrate to receive a modulation signal;

d) a first and second ground electrode that are each positioned on the substrate and that are each electrically connected to ground potential, wherein the signal electrode and the first and second ground electrodes are positioned so that an electric field generated by the signal electrode modulates both the first and second Mach Zehnder interferometer to generate a first modulated optical signal at an output of the combiner of the first Mach Zehnder interferometer and a second modulated optical signal at an output of the combiner of the second Mach Zehnder interferometer; and e) an output combiner having a first input optically coupled to the output of the combiner of the first Mach Zehnder interferometer and having a second input optically coupled to the output of the combiner of the second Mach Zehnder interferometer, the output combiner combining the first and second modulated optical signals at an output of the linearized electro-optic modulator.

2. The linearized electro-optic modulator of claim 1 wherein the substrate comprises a lithium niobate substrate.

3. The linearized electro-optic modulator of claim 2 wherein the lithium niobate substrate comprises X-cut lithium niobate.

4. The linearized electro-optic modulator of claim 2 wherein the lithium niobate substrate comprises Z-cut lithium niobate.

5. The linearized electro-optic modulator of claim 1 wherein the substrate comprises a semiconductor material.

6. The linearized electro-optic modulator of claim 5 wherein the semiconductor material comprises silicon.

7. The linearized electro-optic modulator of claim 5 wherein the semiconductor material comprises gallium arsenide.

8. The linearized electro-optic modulator of claim 5 wherein the semiconductor material comprises a quarternary semiconductor material.

9. The linearized electro-optic modulator of claim 8 wherein the quarternary semiconductor material comprises InGaAsP.

10. The linearized electro-optic modulator of claim 1 wherein the substrate comprises an inorganic material.

11. The linearized electro-optic modulator of claim 1 wherein the substrate comprises a polymer.

12. The linearized electro-optic modulator of claim 1 further comprising a bias electrode.

13. The linearized electro-optic modulator of claim 12 wherein the bias electrode is configured to multiplex a bias signal with a time-varying modulation signal.

14. The linearized electro-optic modulator of claim 1 further comprising a first bias electrode that biases the first Mach Zehnder interferometer and a second bias electrode that biases the second Mach Zehnder interferometer.

15. The linearized electro-optic modulator of claim 1 wherein the linearized electro-optic modulator performs linear-electro-optic-effect modulation.

16. The linearized electro-optic modulator of claim 1 wherein the linearized electro-optic modulator performs carrier injection.

17. The linearized electro-optic modulator of claim 1 wherein the signal electrode is positioned over the first optical waveguide of one of the first or second Mach-Zehnder interferometers and one of the first and second ground electrodes is positioned over the second optical waveguide of the one of the first or second Mach-Zehnder interferometer.

18. The linearized electro-optic modulator of claim 17 wherein the other of the first and second ground electrodes is positioned over the first and second optical waveguide of the other of the first or second Mach-Zehnder interferometer.

19. The linearized electro-optic modulator of claim 1 wherein the signal electrode is positioned over the first optical waveguide of one of the first and the second Mach-Zehnder interferometers, and one of the first and second ground electrodes is positioned over the second optical waveguide of the one of the first and the second Mach-Zehnder interferometers.

20. The linearized electro-optic modulator of claim 19 wherein the other of the first and second ground electrodes is positioned over an optical waveguide of the other one of the first and the second Mach-Zehnder interferometers.

21. The linearized electro-optic modulator of claim 1 wherein each of the first and second Mach-Zehnder interferometers have a different $V\pi$.

22. The linearized electro-optic modulator of claim 21 wherein a ratio of a $V\pi$ of the first Mach-Zehnder interferometer to a $V\pi$ of the second Mach-Zehnder is substantially invariant with RF frequency.

23. The linearized electro-optic modulator of claim 22 wherein the ratio of the $V\pi$ of the first Mach-Zehnder interferometer to the $V\pi$ of the second Mach-Zehnder that is substantially invariant with RF frequency is chosen to impart a predetermined performance to an RF photonic link.

24. The linearized electro-optic modulator of claim 23 wherein the predetermined performance comprises an optimum performance.

25. The linearized electro-optic modulator of claim 22 wherein the ratio of the $V\pi$ of the first Mach-Zehnder interferometer to the $V\pi$ the second Mach-Zehnder is approximately equal to two.

26. The linearized electro-optic modulator of claim 1 wherein each of the first and second Mach-Zehnder interferometers has a different efficiency.

27. The linearized electro-optic modulator of claim 1 wherein the signal electrode comprises a plurality of electrode segments.

28. The linearized electro-optic modulator of claim 27 wherein at least some of the plurality of electrode segments comprises a gain element.

29. The linearized electro-optic modulator of claim 1 wherein the output combiner comprises an optical splitter.

30. The linearized electro-optic modulator of claim 1 wherein the output combiner comprises a wavelength division multiplexer.

31. An RF photonic link comprising:

a) an optical source;

b) a linearized electro-optic modulator comprising:

i) a first Mach Zehnder interferometer formed on a substrate and comprising a splitter having an input that is optically coupled to an output of the optical source and a first and second output, where a respective one of the first and second output of the splitter is optically coupled to a respective input of a first and second optical waveguide, and a combiner having a first and second input, where a respective one of the first and second input of the combiner is optically coupled to a respective output of the first and second optical waveguide;
ii) a second Mach Zehnder interferometer formed on the substrate and comprising a splitter having an input that is optically coupled to an output of the optical source and a first and second output, where a respective one of the first and second output of the splitter is optically coupled to a respective input of a first and a second optical waveguide, and a combiner having a first and second input, where a respective one of the first and second input of the combiner is optically coupled to a respective output of the first and second optical waveguide;
iii) a signal electrode positioned on the substrate to receive a modulation signal;
iv) a first and second ground electrode positioned on the substrate that are electrically connected to ground potential, wherein the signal electrode and the first and second ground electrodes are positioned so that an electric field generated by the signal electrode modulates both the first and second Mach Zehnder interferometer to generate a first modulated optical signal at an output of the combiner of the first Mach Zehnder interferometer and a second modulated optical signal at an output of the combiner of the second Mach Zehnder interferometer; and
v) an output combiner having a first input optically coupled to the output of the combiner of the first Mach Zehnder interferometer and having a second input optically coupled to the output of the combiner of the second Mach Zehnder interferometer, the output combiner combining the first and second modulated optical signals at an output of the linearized electro-optic modulator; and
c) an optical detector having an input that is coupled to the output of the linearized electro-optic modulator, the optical detector generating a substantially linear RF signal.

32. The RF photonic link of claim 31 wherein the optical source comprises a single optical source.

33. The RF photonic link of claim 31 wherein the optical source comprises a first laser having an output that is coupled to the input of the splitter of the first Mach Zehnder interferometer and a second laser having an output that is coupled to the input of the splitter of the second Mach Zehnder interferometer.

34. The RF photonic link of claim 33 wherein the first laser emits light at a first wavelength and the second laser emits light at a second wavelength that is different from the first wavelength.

35. The RF photonic link of claim 31 wherein the optical detector comprises a single photodetector.

36. The RF photonic link of claim 31 wherein the optical detector comprises a first optical detector that is optically coupled to the output of the combiner of the first Mach Zehnder interferometer of the linearized electro-optic modulator and a second optical detector that is optically coupled to the output of the combiner of the second Mach Zehnder interferometer of the linearized electro-optic modulator.

37. The RF photonic link of claim 31 wherein the optical detector comprises a balanced photodetector with a single differential output.

38. The RF photonic link of claim 31 wherein the output combiner comprises a wavelength-division multiplexer combiner that generates a wavelength-division multiplexed signal.

39. The RF photonic link of claim 31 wherein the linearized electro-optic modulator is configured to achieve quadrature bias points to reduce even-order distortion products.

40. The RF photonic link of claim 31 wherein the linearized electro-optic modulator is configured to minimize $3^{rd}$-order distortion products.

41. The RF photonic link of claim 31 wherein the linearized electro-optic modulator is configured to minimize $2^{nd}$-order distortion products.

42. The RF photonic link of claim 31 wherein at least one of the first and the second Mach-Zehnder interferometer are configured so that the linearized electro-optic modulator achieves non-quadrature bias points.

43. The RF photonic link of claim 31 wherein the signal electrode comprises a plurality of electrode segments.

44. The RF photonic link of claim 43 wherein at least some of the plurality of electrode segments comprises a gain element.

45. A linearized electro-optic modulator comprising:
a) a substrate comprising a first Mach Zehnder interferometer comprising a first and second optical waveguide and a second Mach Zehnder interferometer comprising a first and a second optical waveguide;
b) a signal electrode positioned on the substrate to receive a modulation signal; and
c) a first and second ground electrode positioned on the substrate that are electrically connected to ground potential,
wherein the signal electrode and the first and second ground electrodes are positioned so that an electric field generated by the signal electrode modulates both the first and second Mach Zehnder interferometer to generate a first and a second modulated optical signal and wherein the signal electrode is positioned over the first optical waveguide of one of the first or second Mach-Zehnder interferometers and one of the first and second ground electrodes is positioned over the second optical waveguide of the one of the first or second Mach-Zehnder interferometer.

46. An RF photonic link comprising:
a) an optical source;
b) a linearized electro-optic modulator comprising:
i) a substrate comprising a first Mach Zehnder interferometer comprising a first and second optical waveguide having an input that is optically coupled to an output of the optical source and a second Mach Zehnder interferometer comprising a first and a second optical waveguide that is optically coupled to an output of the optical source;
ii) a signal electrode comprising a plurality of electrode segments and positioned on the substrate to receive a modulation signal; and
iii) a first and second ground electrode positioned on the substrate that are electrically connected to ground potential,
wherein the signal electrode and the first and second ground electrodes are positioned so that an electric field generated by the signal electrode modulates both the first and second Mach Zehnder interferometer to generate a first modulated optical signal at a first output and a second modulated optical signal at a second output; and c) an optical receiver having a first input that is coupled to the first optical output of the linearized electro-optic modulator and a second input that is coupled to the second output of linearized electro-optic modulator, the optical receiver generating a substantially linear RF signal.

* * * * *